(12) United States Patent
Podhajny et al.

(10) Patent No.: US 10,689,783 B2
(45) Date of Patent: *Jun. 23, 2020

(54) FABRIC CONTROL DEVICE

(71) Applicant: Apple Inc., Cupertino, CA (US)

(72) Inventors: Daniel A. Podhajny, San Jose, CA (US); Daniel D. Sunshine, Sunnyvale, CA (US); Kathryn P. Crews, Menlo Park, CA (US)

(73) Assignee: Apple Inc., Cupertino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/584,005

(22) Filed: Sep. 26, 2019

(65) Prior Publication Data

US 2020/0017999 A1 Jan. 16, 2020

Related U.S. Application Data

(63) Continuation of application No. 16/207,407, filed on Dec. 3, 2018, now Pat. No. 10,465,314, which is a
(Continued)

(51) Int. Cl.
*G06F 1/16* (2006.01)
*D03D 1/00* (2006.01)
*A41D 1/00* (2018.01)
*A41D 31/02* (2019.01)
*G06F 3/041* (2006.01)
(Continued)

(52) U.S. Cl.
CPC ........... *D03D 1/0088* (2013.01); *A41D 1/005* (2013.01); *A41D 31/02* (2013.01); *D03D 1/0082* (2013.01); *G06F 3/042* (2013.01);
*G06F 3/044* (2013.01); *G06F 3/0414* (2013.01); *G06F 3/04883* (2013.01); *D02G 3/441* (2013.01); *D10B 2401/16* (2013.01); *D10B 2401/18* (2013.01); *G06F 2203/04102* (2013.01)

(58) Field of Classification Search
CPC ...................................................... G06F 1/163
USPC .................................................... 361/679.03
See application file for complete search history.

(56) References Cited

U.S. PATENT DOCUMENTS 6,937,227 B2   8/2005   Qamhiyah et al.
7,144,293 B2  12/2006   Mann et al.
(Continued)

*Primary Examiner* — Anthony Q Edwards
(74) *Attorney, Agent, or Firm* — Treyz Law Group, P.C.; G. Victor Treyz; Joseph F. Guihan

(57) ABSTRACT

A fabric-based item may include a housing that is covered in fabric. Areas of the fabric may overlap input circuitry such as button switches, touch sensors, force sensors, proximity sensors, and other sensing circuitry and may overlap other components such as light-emitting components and haptic output devices. The fabric-based item may include control circuitry that gathers user input from the input circuitry and wireless communications circuitry that the control circuitry uses to transmit remote control commands and other wireless signals in response information from the input circuitry. The fabric-based item may have a weight that is located in the housing to orient the housing in a desired direction when the housing rests on a surface. A movable weight may tilt the housing in response to proximity sensor signals or other input. Portions of the fabric may overlap light-emitting components and optical fiber configured to emit light.

20 Claims, 17 Drawing Sheets

Related U.S. Application Data continuation of application No. 15/940,842, filed on Mar. 29, 2018, now Pat. No. 10,156,029.

(60) Provisional application No. 62/519,386, filed on Jun. 14, 2017.

(51) Int. Cl.
 *G06F 3/044* (2006.01)
 *G06F 3/0488* (2013.01)
 *G06F 3/042* (2006.01)
 *D02G 3/44* (2006.01)

(56) References Cited

U.S. PATENT DOCUMENTS

| | | | |
|---|---|---|---|
| 9,588,551 B1* | 3/2017 | Hegde | G06F 1/181 |
| 9,830,783 B1 | 11/2017 | Kessler et al. | |
| 10,056,205 B2* | 8/2018 | Hegde | G06F 1/1662 |
| 10,145,036 B1 | 12/2018 | Sunshine et al. | |
| 10,156,029 B1* | 12/2018 | Podhajny | D03D 1/0082 |
| 10,465,314 B2* | 11/2019 | Podhajny | G06F 3/0414 |
| 2008/0168396 A1 | 7/2008 | Matas et al. | |
| 2008/0266112 A1 | 10/2008 | van de Sluis et al. | |
| 2009/0256817 A1 | 10/2009 | Perlin et al. | |
| 2014/0262715 A1* | 9/2014 | Lee | B41M 5/267 |
| | | | 200/5 A |
| 2015/0293661 A1 | 10/2015 | Gomez | |
| 2016/0198996 A1 | 7/2016 | Dullen | |
| 2016/0282988 A1 | 9/2016 | Poupyrev | |
| 2016/0283101 A1 | 9/2016 | Schwesig et al. | |
| 2016/0345638 A1* | 12/2016 | Robinson | A41D 1/005 |
| 2017/0233903 A1* | 8/2017 | Jeon | D03D 13/004 |
| | | | 139/425 R |
| 2017/0249033 A1* | 8/2017 | Podhajny | D03D 15/00 |
| 2017/0251555 A1 | 8/2017 | Sunshine et al. | |
| 2017/0370030 A1 | 12/2017 | Podhajny et al. | |
| 2018/0195218 A1 | 7/2018 | Hamada et al. | |

\* cited by examiner

FABRIC CONTROL DEVICE

This application is a continuation of U.S. patent application Ser. No. 16/207,407, filed Dec. 3, 2018, which is a continuation of U.S. patent application Ser. No. 15/940,842, filed Mar. 29, 2018, which claims the benefit of provisional patent application No. 62/519,386, filed Jun. 14, 2017, which are hereby incorporated by reference herein in their entireties.

FIELD

This relates generally to fabric-based items and, more particularly, to fabric-based items such as electronic devices with fabric surfaces.

BACKGROUND

It may be desirable to form bags, furniture, clothing, electronic devices, and other items using materials such as fabric. If care is not taken, however, fabric-based items such as these may not offer desired features. For example, a fabric-based electronic device may be awkward to use, may not have an attractive appearance, or may not offer desired functionality.

SUMMARY

A fabric-based item may include a housing that is covered in fabric. The fabric may include conductive strands that form touch sensor circuitry. The fabric may include portions that are patterned differently and that have different properties. For example, the fabric may include areas that transmit more light than other areas or are more opaque than other areas or may include areas that are smoother than other areas or that are coarser than other areas. Button labels and other features may be formed by weaving or otherwise intertwining strands of material in the fabric with desired patterns, by processing fabric through application of heat and using other processing techniques, and by applying ink or other materials.

Areas of the fabric such as areas with enhanced light transmission, button labels, distinct textures, or other attributes may overlap input circuitry such as button switches, touch sensor circuits, force sensors, proximity sensors, and other sensing circuitry. The fabric-based item may include control circuitry that gathers user input from the input circuitry and wireless communications circuitry that the control circuitry uses to transmit remote control commands and other wireless signals in response information from the input circuitry. Remote control commands may be used to remotely control electronic equipment.

In some configurations, the fabric-based item may have a weight that is located in the housing to orient the housing in a desired direction when the housing rests on a surface. A movable weight may tilt the housing in response to proximity sensor signals or other input. Portions of the fabric may overlap light-emitting components and optical fiber configured to emit light.

DETAILED DESCRIPTION

Figure 1:
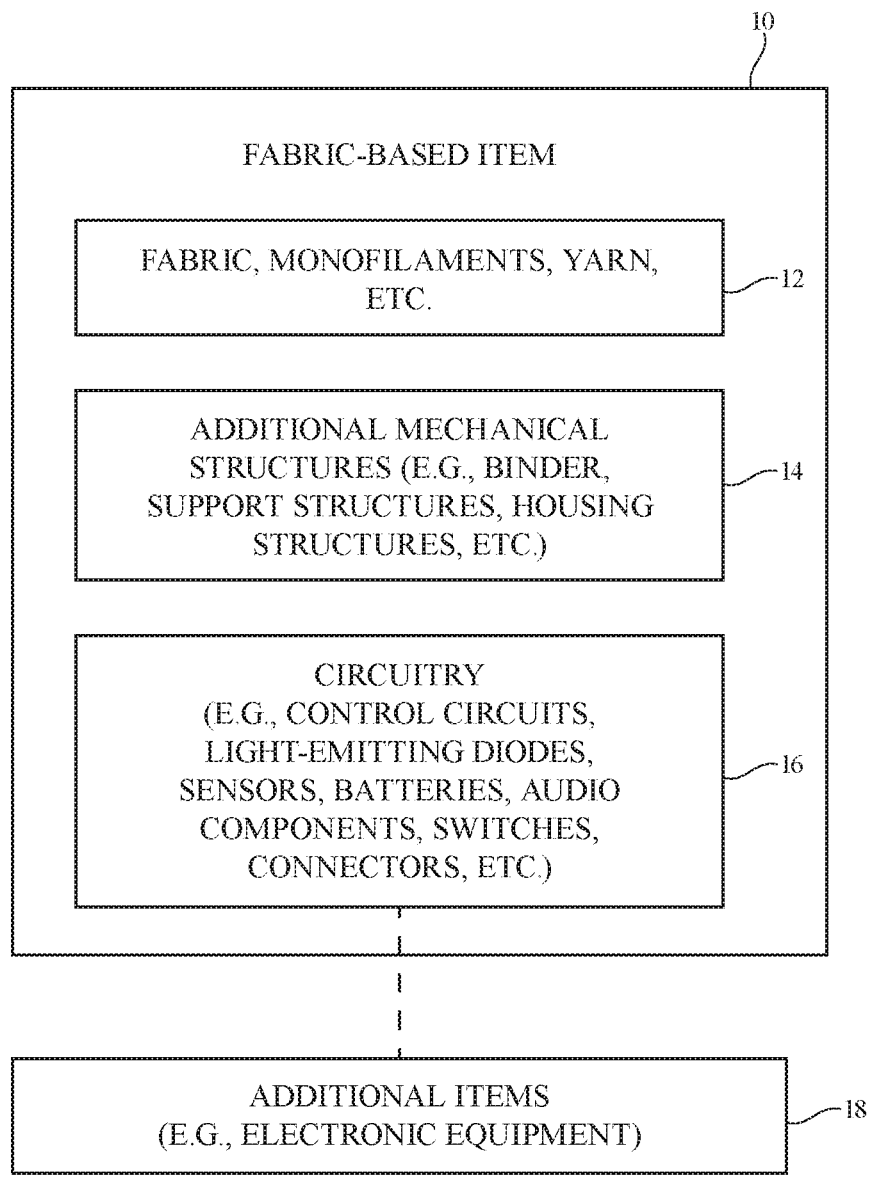
FIG. 1 is a schematic diagram of an illustrative fabric-based item in accordance with an embodiment.

Items such as item 10 of FIG. 1 may be based on fabric. Item 10 may be an electronic device or an accessory for an electronic device such as a laptop computer, a computer monitor containing an embedded computer, a tablet computer, a cellular telephone, a media player, or other handheld or portable electronic device, a smaller device such as a wrist-watch device, a pendant device, a headphone or earpiece device, a device embedded in eyeglasses or other equipment worn on a user's head, or other wearable or miniature device, a television, a computer display that does not contain an embedded computer, a gaming device, a remote control, a navigation device, an embedded system such as a system in which fabric-based item 10 is mounted in a kiosk, in an automobile, airplane, or other vehicle, other electronic equipment, or may be equipment that implements the functionality of two or more of these devices. If desired, item 10 may be a removable external case for electronic equipment, may be a strap, may be a wrist band or head band, may be a removable cover for a device, may be a case or bag that has straps or that has other structures to receive and carry electronic equipment and other items, may be a necklace or arm band, may be a wallet, sleeve, pocket, or other structure into which electronic equipment or other items may be inserted, may be part of a chair, sofa, or other seating (e.g., cushions or other seating structures), may be part of an item of clothing or other wearable item (e.g., a hat, belt, wrist band, headband, sock, glove, shirt, pants, etc.), or may be any other suitable fabric-based item.

Item 10 may include intertwined strands of material that form fabric 12. Fabric 12 may form all or part of a housing wall or other layer in an electronic device, may form an outer covering for a housing wall structure, may form internal structures in an electronic device, or may form other fabric-based structures. Item 10 may be soft (e.g., item 10 may have a fabric surface that yields to a light touch), may have a rigid feel (e.g., the surface of item 10 may be formed from a stiff fabric), may be coarse, may be smooth, may have ribs or other patterned textures, and/or may be formed as part of a device that has portions formed from non-fabric structures of plastic, metal, glass, crystalline materials, ceramics, or other materials.

The strands of material in fabric 12 may be single-filament strands (sometimes referred to as fibers or monofilaments), may be yarns or other strands that have been formed by intertwining multiple filaments (multiple monofilaments) of material together, or may be other types of strands (e.g., tubing). Monofilaments for fabric 12 may include polymer monofilaments and/or other insulating monofilaments and/or may include bare wires and/or insulated wires. Monofilaments formed from polymer cores with metal coatings and monofilaments formed from three or more layers (cores, intermediate layers, and one or more outer layers each of which may be insulating and/or conductive) may also be used.

Yarns in fabric 12 may be formed from polymer, metal, glass, graphite, ceramic, natural materials as cotton or bamboo, or other organic and/or inorganic materials and combinations of these materials. Conductive coatings such as metal coatings may be formed on non-conductive material. For example, plastic yarns and monofilaments in fabric 12 may be coated with metal to make them conductive. Reflective coatings such as metal coatings may be applied to make yarns and monofilaments reflective. Yarns may be formed from a bundle of bare metal wires or metal wire intertwined with insulating monofilaments (as examples).

Strands of material may be intertwined to form fabric 12 using intertwining equipment such as weaving equipment, knitting equipment, or braiding equipment. Intertwined strands may, for example, form woven fabric, knit fabric, braided fabric, etc. Conductive strands and insulating strands may be woven, knit, braided, or otherwise intertwined to form contact pads that can be electrically coupled to conductive structures in item 10 such as the contact pads of an electrical component. The contacts of an electrical component may also be directly coupled to an exposed metal segment along the length of a conductive yarn or monofilament.

Conductive and insulating strands may also be woven, knit, or otherwise intertwined to form conductive paths. The conductive paths may be used in forming signal paths (e.g., signal buses, power lines, etc.), may be used in forming part of a capacitive touch sensor electrode, a resistive touch sensor electrode, or other input-output device, or may be used in forming other patterned conductive structures. Conductive structures in fabric 12 may be used in carrying power signals, digital signals, analog signals, sensor signals, control signals, data, input signals, output signals, or other suitable electrical signals.

Item 10 may include additional mechanical structures 14 such as polymer binder to hold strands in fabric 12 together, support structures such as frame members, housing structures (e.g., an electronic device housing), and other mechanical structures.

Item 10 may include circuitry 16. Circuitry 16 may include electrical components that are coupled to fabric 12, electrical components that are housed within an enclosure formed by fabric 12 and/or an enclosure formed using other housing structures such as housing walls formed from plastic, metal, glass, ceramic, or other materials, electrical components that are attached to fabric 12 using welds, solder joints, adhesive bonds (e.g., conductive adhesive bonds such as anisotropic conductive adhesive bonds or other conductive adhesive bonds), crimped connections, or other electrical and/or mechanical bonds. Circuitry 16 may include metal structures for carrying current, electrical components such as integrated circuits, light-emitting diodes, sensors, controller circuitry for applying currents and/or magnetic fields to materials, and other electrical devices. Control circuitry in circuitry 16 (e.g., control circuitry formed from one or more integrated circuits such as microprocessors, microcontrollers, application-specific integrated circuits, digital signal processors, etc.) may be used to gather information from user input circuitry, sensing circuitry such as touch sensors, force sensors, proximity sensors, and other sensing circuitry, and other input-output circuits. The control circuitry may be used to control the operation of item 10 based on this gathered information and/or based on other information by controlling electrically controllable (electrically adjustable) components in circuitry 16. The control circuitry may have wireless communications circuitry and other communications circuitry and may be used in supporting communications with item 18 and/or other devices.

Item 10 may interact with electronic equipment or other additional items 18. Items 18 may be attached to item 10 or item 10 and item 18 may be separate items that are configured to operate with each other (e.g., when one item is a case and the other is a device that fits within the case, when one item such as item 10 is a remote control and another item such as item 18 is an electronic device that is controlled by the remote control such as a set-top box, television, computer, gaming unit, speaker, or other electronic equipment that is controlled remotely, etc.). Circuitry 16 may include wireless communications circuitry such as antennas, wireless radio-frequency transceivers (e.g., transceivers operating at 2.4 GHz, 5 GHz, and/or other wireless communications frequencies) and other electrical components for supporting wireless communications with item 18. The wireless communications circuitry may include communications circuitry based on infrared transmitters such as infrared light-emitting diodes or lasers for transmitting infrared commands to electronic equipment such as item 18. Item 18 may also interact with item 10 using a wired communications link or other connection that allows information to be exchanged.

In some situations, item 18 may be an electronic device such as a cellular telephone, computer, or other portable electronic device and item 10 may form a cover, case, bag, or other structure that receives the electronic device in a pocket, an interior cavity, or other portion of item 10.

In other situations, item 18 may be a wrist-watch device or other electronic device and item 10 may be a strap or other fabric-based item that is attached to item 18 (e.g., item 10 and item 18 may be used together to form a fabric-based item such as a wristwatch with a strap). Item 10 may also be a cellular telephone, tablet computer, wearable device, voice-controlled speaker, or other equipment.

In still other situations, item 10 may be an electronic device such as a fabric-covered remote control device (e.g., a fabric-covered remote control that has a majority of its surface or other suitable fraction of its surface covered with fabric 12). The remote control device may be used in controlling external electronic equipment (e.g., item 18).

Fabric 12 may be used in forming a remote control device or other electronic device. The fabric may serve as a covering layer for the housing of a remote control or other device and may cover one or more user input areas associated with virtual buttons, switches, touch-sensitive buttons labeled with symbols, track pad areas formed from two-dimensional touch sensors, or other user input components (e.g., sensors for detecting user touch input, proximity input, and/or force input). In these situations, control circuitry in item 10 may use wireless communications circuitry in item 10 to communicate wirelessly with item 18 (e.g., to wirelessly transmit control commands to item 18 such as channel change commands, media playback adjustment commands such as fast forward and reverse playback commands, track navigation commands, power on/off commands, volume change commands, media search commands, etc.). Item 18 in this scenario may be electronic equipment that is wirelessly controlled by item 10 such as a set-top box, speaker, television, computer, gaming unit, etc.

The fabric that makes up item 10 may be formed from strands that are intertwined using any suitable intertwining equipment. With one suitable arrangement, which may sometimes be described herein as an example, fabric 12 may be woven fabric formed using a weaving machine. In this type of illustrative configuration, fabric may have a plain weave, a basket weave, a satin weave, a twill weave, or variations of these weaves, may be a three-dimensional woven fabric, or may be other suitable fabric. With other suitable arrangements, fabric 12 is knit or braided. If desired, signal paths formed from conductive yarns and monofilaments (e.g., insulated and bare wires) may be used to route signals in item 10 and/or item(s) 18.

Figure 2:
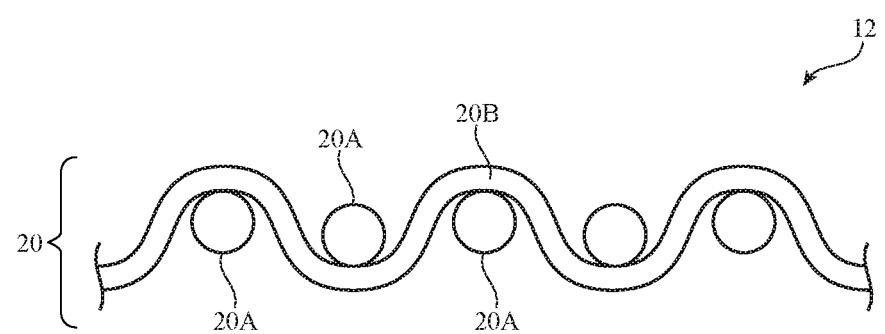
FIG. 2 is a side view of illustrative woven fabric in accordance with an embodiment.

A cross-sectional side view of illustrative woven fabric 12 is shown in FIG. 2. As shown in FIG. 2, fabric 12 may include strands 20 such as warp strands 20A and weft strands 20B. In the illustrative configuration of FIG. 2, fabric 12 has a single layer of woven strands 20. Multi-layer fabric constructions may be used for fabric 12 if desired.

Figure 3:
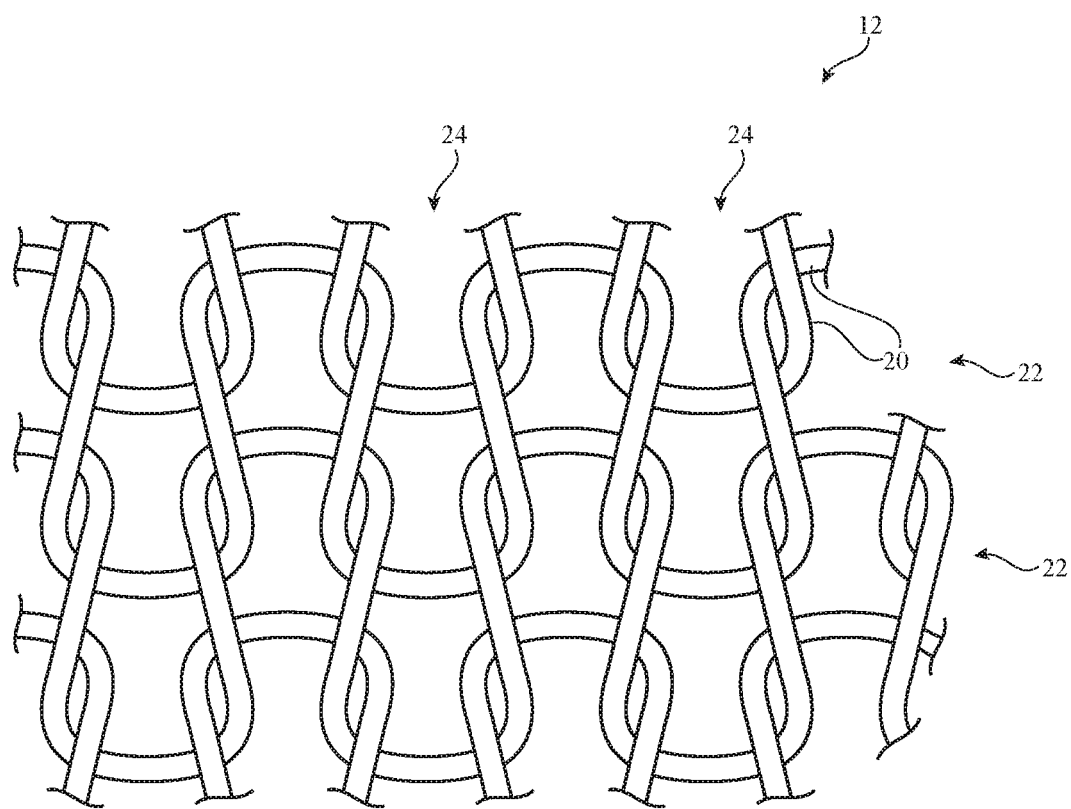
FIG. 3 is a top view of illustrative knit fabric in accordance with an embodiment.

As shown in FIG. 3, fabric 12 may be a knit fabric. In the illustrative configuration of FIG. 3, fabric 12 has a single layer of knit strands 20 that form horizontally extending rows of interlocking loops (courses 22) and vertically extending wales 24. Other types of knit fabric may be used in item 10, if desired.

Fabric-based item 10 may include non-fabric materials (e.g., structures such as structures 14 that are formed from plastic, metal, glass, ceramic, crystalline materials such as sapphire, etc.). These materials may be formed using molding operations, extrusion, machining, laser processing, and other fabrication techniques and may be used in forming housing structures, internal mounting structures, buttons, portions of display components and other electronic components, and/or other structures in item 10. In some configurations, some or all of fabric-based item 10 may include one or more layers of material. The layers in item 10 may include layers of polymer, metal, glass, fabric, adhesive, crystalline materials, ceramic, substrates on which components have been mounted, patterned layers of material, layers of material containing patterned metal traces, thin-film devices such as transistors, and/or other layers.

Figure 4:
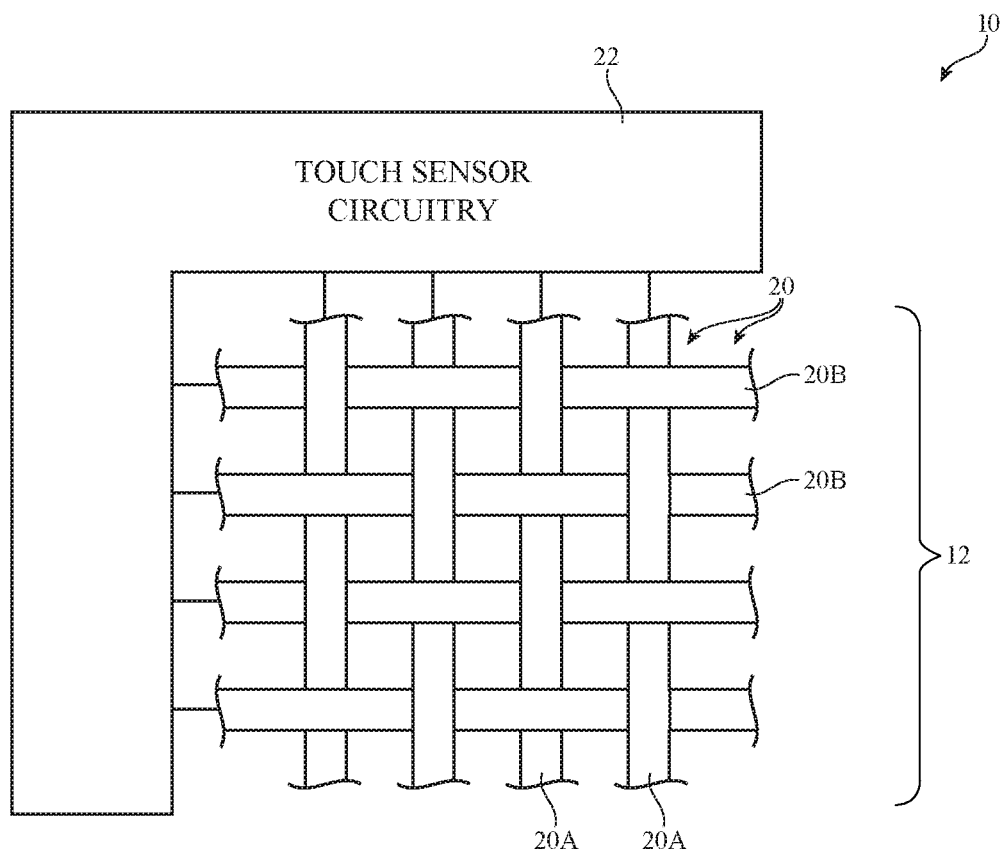
FIG. 4 is a diagram of an illustrative touch sensor formed using fabric in accordance with an embodiment.

As shown in FIG. 4, item 10 may include a sensor such as a touch sensor. The touch sensor may have electrodes formed from metal electrodes (e.g., patterned metal traces on a printed circuit or other substrate), transparent conductive electrodes (e.g., indium tin oxide electrodes), and/or other touch sensor electrodes. In the illustrative configuration of FIG. 4, item 10 includes a touch sensor formed from electrodes in fabric 12 such as conductive strands 20 in fabric 12. These conductive strands may be coupled to input circuitry such as touch sensor circuitry 22 (e.g., touch sensor circuitry in circuitry 16 of FIG. 1) or other sensing circuitry. For example, fabric 12 may include conductive weft strands 20A and overlapping orthogonally oriented warp strands 20B. These conductive strands form column and row electrodes in an intersecting grid (electrode array). During operation, a user's finger or other external object (e.g. a stylus, etc.) may be present at the intersection between a horizontal and vertical electrode and can perturb capacitive coupling between these electrodes. Touch sensor control circuitry such as touch sensor circuitry 22 may supply strands 20B (or strands 20A) with drive signals and may gather and analyze corresponding sense signals from warp strands 20A (or strands 20B). By processing the touch sensor signals from touch sensor circuitry 22 and/or other control circuitry in item 10, item 10 can detect capacitance variations due to the presence of a user's finger or other external object at an intersection between a weft and warp strand, thereby allowing item 10 to determine the location of a touch input.

Figure 5:
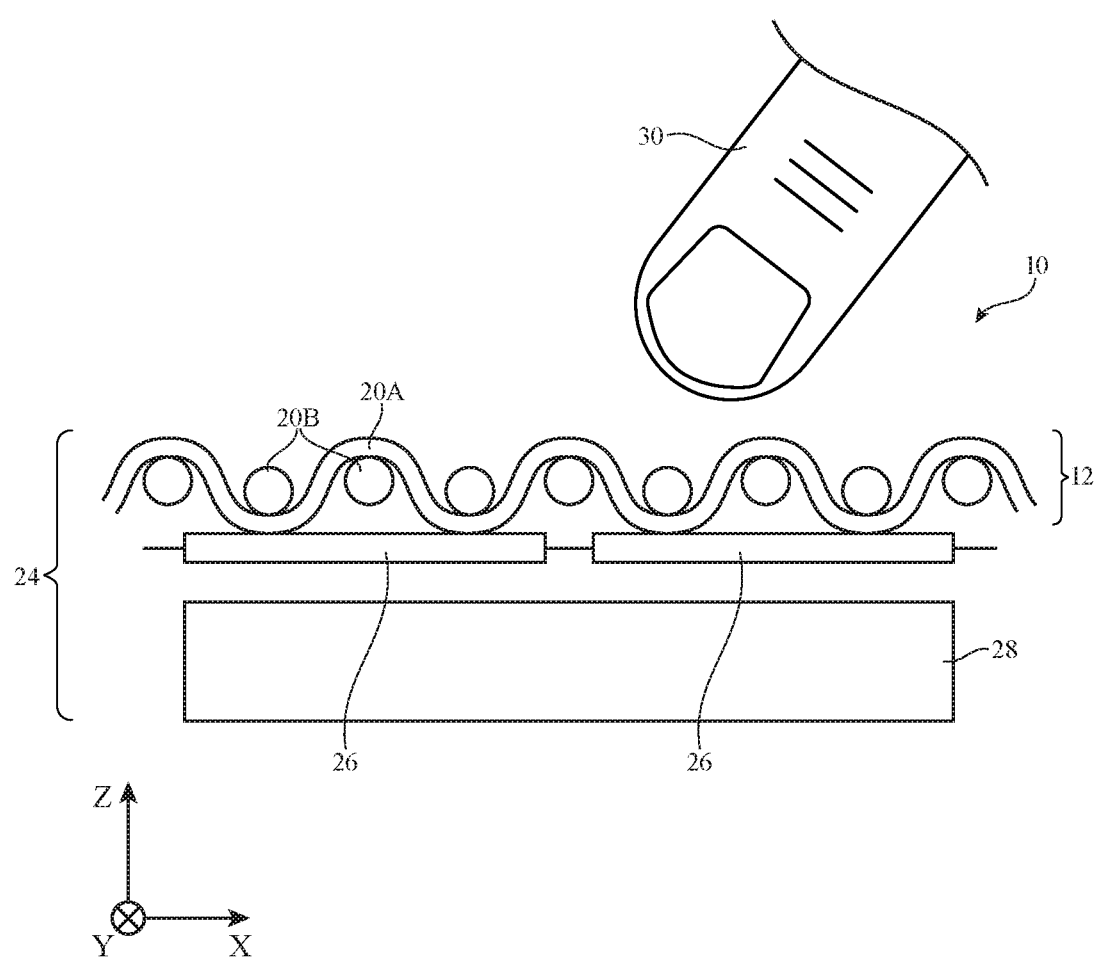
FIG. 5 is a cross-sectional side view of an illustrative fabric layer overlapping electrical components in accordance with an embodiment.

FIG. 5 is a cross-sectional side view of a portion of the surface of an illustrative fabric-based item. In the illustrative configuration of FIG. 5, item 10 includes structures 24 such as sensing circuitry and housing structures. Structures 24 may include fabric 12 (e.g., a fabric covering layer that forms the exterior surface of item 10). Fabric 12 may include strands such as warp strands 20B and weft strands 20A. If desired, fabric 12 may include a grid of conductive strands for forming a touch sensor such as the two-dimensional touch sensor of FIG. 4 or other suitable touch sensor. Fabric 12 may overlap components 26 and internal structures 28. Internal structures 28 may be housing structures such as housing walls or supporting housing structures formed from rigid polymer, foam or other soft polymer (e.g., an elastomeric material), metal, ceramic, glass, etc. Components 26 may be electrodes for a touch sensor or a capacitive proximity sensor, may include light-based components such as light-emitting diodes and/or light sensors (e.g., optical proximity sensors), may include haptic output devices, may include force sensors, and/or may include other electrical components or circuitry 16.

Light-based devices in components 26 may include light-emitting diodes, lasers, and other light-emitting components that produce light. The emitted light may serve as illumination for a camera or other sensor, may serve as decorative trim, may serve as a visual status indicator (e.g., a power on/off indicator light), may illuminate a key label (button label) or other symbol, may be used in displaying images (e.g., in configuration in which components 26 form an array of pixels in a display), may be used as part of an optical proximity sensor (e.g., in a sensor that detects reflected light such as infrared light to determine whether external objects such as user body part or other object 30 is within the vicinity of item 10 (e.g., whether an external object is within a predetermined distance of item 10), or may be used in other light-based circuitry for item 10.

If desired, optical touch sensors may operate through fabric 12. In this type of configuration, components 26 may include an array of light-emitting devices such as an array of light-emitting diodes and may include an array of light detectors (e.g., photodiodes). The light-emitting array and the light detecting array may each extend over some or all of the surface of fabric 12 (e.g., in the X-Y plane in the example of FIG. 5). When a user's finger or other external object (see, e.g., finger 30) touches fabric 12, light that has been emitted by one of the light-emitting devices will be detected by a nearby light detector, thereby allowing the location of the external object to be detected (e.g., allowing the XY location of the external object on fabric 12 to be detected). If desired, fabric 12 and/or strain gauges in components 26 may be used in forming a force sensor under one or all of the surfaces of item 10 that are covered with fabric 12. Optical proximity sensors based on light emitters and light detectors may also operate through fabric 12.

Capacitive proximity sensors may use electrodes formed from conductive strands or may use electrodes formed from metal traces on a printed circuit in components 26. Capacitive proximity sensors or optical proximity sensors may be used to detect hand swipes and other user gestures.

Haptic devices in components 26 may be used to provide a user with tactile feedback. Haptic devices may be based on electromagnetic actuators (e.g., vibrators, linear solenoids that move to produce a clicking sensation, piezoelectric actuators, and/or other haptic devices). Haptic output may be used, for example, to confirm to a user that a user has pressed a button (e.g., a virtual button) on the surface of fabric 12. A virtual button may be crated, for example, by using light sources in components 26 to emit light (e.g., a button trim pattern, a glyph such as an alphanumeric key label or other symbol, etc.) while monitoring for touch input in the region associated with the emitted light (e.g., in the area associated with the virtual button). If touch input in the virtual button area is detected, tactile feedback may be provided using an overlapping haptic device so that a user is reassured that the virtual button press has been detected by circuitry 16. In general, haptic output may be used to provide any suitable tactile output for a user (e.g., to provide a user with an alert, to serve as a vibrating feedback when item 10 is being used as a game controller or pointing device, to provide button press feedback, etc.).

Figure 6:
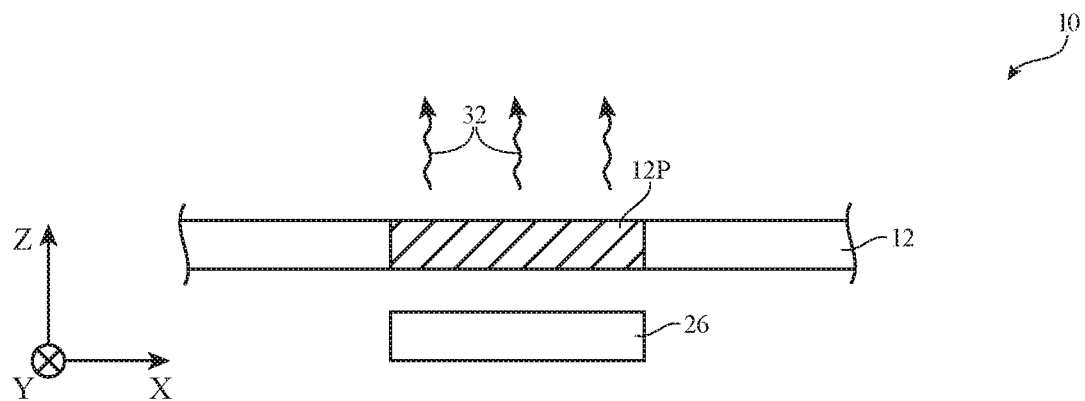
FIG. 6 is a cross-sectional side view of an illustrative fabric layer that is overlapping a light-based component in accordance with an embodiment.

In some configurations, portions of fabric 12 such as illustrative portion 12P of FIG. 6 may be configured to facilitate light transmission and/or to help modify light 32 that has been emitted from components 26 and/or that is being detected by components 26. In the example of FIG. 6, fabric 12 overlaps component 26. Component 26 may, as an example, be a light-emitting device such as a light-emitting diode, an array of light-emitting diodes or other structures forming a status indicator light or forming a pixelated display (e.g., a pixel array in the X-Y plane). In portions of fabric 12 other than portion 12P, fabric 12 may be opaque to hide internal components in item 10 from view. In portions of fabric 12 such as portion 12P, fabric 12 may be transparent (e.g., hazy and therefore translucent or clear with a low haze) or may otherwise be less opaque (more light transmissive and therefore more transparent) than in the rest of fabric 12. Portions such as portion 12P, which may sometimes be referred to as optical windows or light-transmitting windows, may be formed by heat treating a localized area of fabric 12 (e.g., to melt strands 20 together to form portion 12P), by selectively incorporating clear polymer binder or other material into portion 12P, by forming portion 12P from a different type of strand (e.g., clear strands) than the other portions of fabric 12, and/or by otherwise processing fabric 12 to form portion 12P. If desired, portions such as portion 12P may be heat treated, chemically treated, impregnated with polymer or other materials, and/or otherwise processed to form other type of features in fabric 12 (e.g., features with low surface roughness, features that have the pattern of a logo or other visible item), etc. In these configurations, portion 12P need not be transparent.

Figure 7:
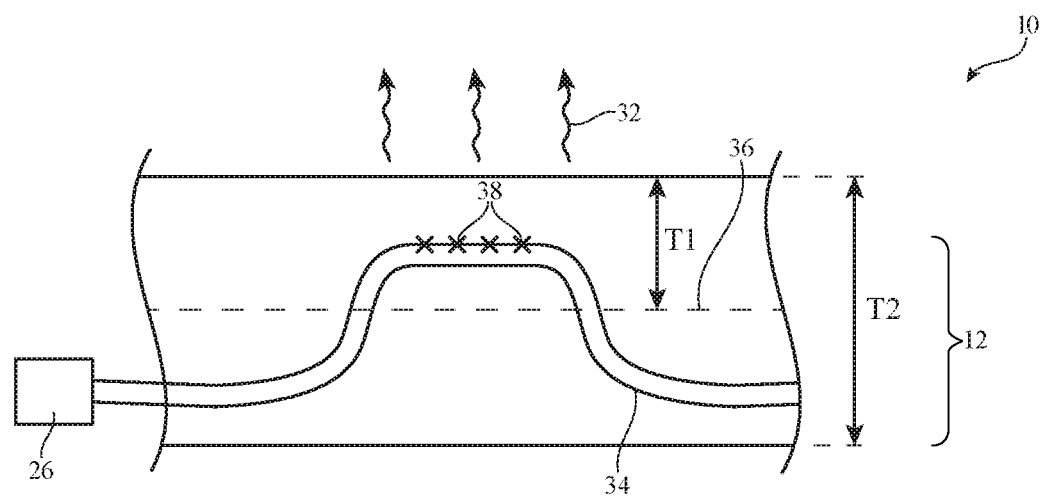
FIG. 7 is a cross-sectional side view of an illustrative fabric layer with an optical fiber that is used in emitting light from a portion of the fabric layer in accordance with an embodiment.

In the example of FIG. 7, light 32 has been coupled into optical light guide 34 (e.g., a strand such as a glass optical fiber, a strand such as a polymer optical fiber, a strand formed from other clear structures, etc.) from a light source (e.g., an electrical component 26 such as a light-emitting diode or other light-emitting component). Light guide 34 may have light-scattering structures 38 such a recesses and/or protrusions that scatter light from light guide (fiber) 34 outwardly as light 32 (e.g., for a status indicator light, for an illuminated key symbol, for a pixel in a pixel array, etc.). Control circuitry in item 10 may adjust the amount of light that is emitted from component 26 to adjust the brightness of emitted light 32. Light guide 34 may be selectively incorporated into fabric 12 in desired locations (e.g., when the thickness of fabric 12 is thickness T1 as shown by line 36) or may be embedded into fabric 12 (e.g., when fabric 12 has thickness T2). If desired, optical light guide 34 may be a warp or weft strand in fabric 12.

Figure 8:
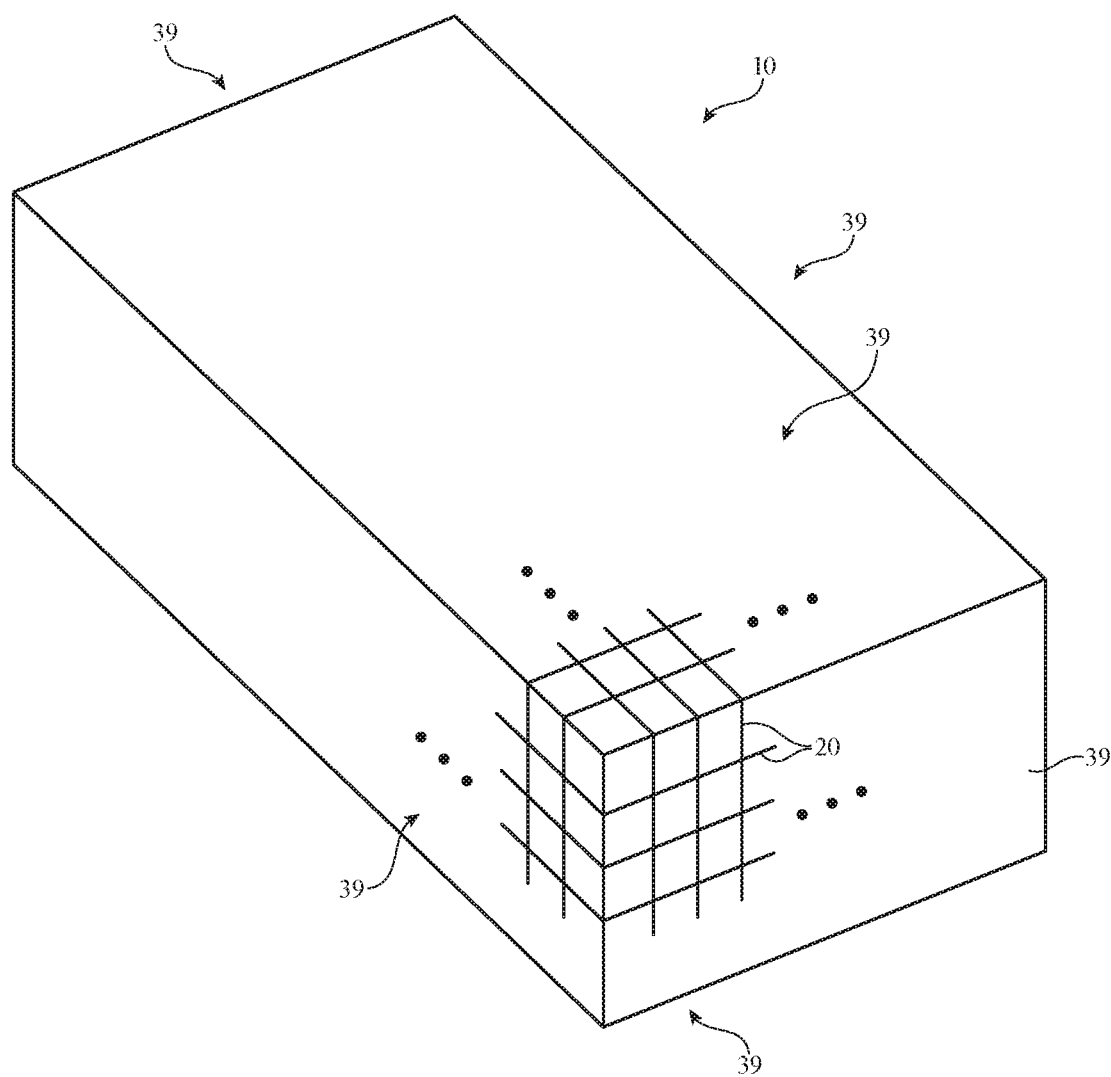
FIG. 8 is a perspective view of a fabric-based item such as a remote control device or other electronic device covered with fabric in accordance with an embodiment.

FIG. 8 shows how strands 20 may wrap around some or all of the faces of an illustrative electronic device. In general, any suitable fraction of the total surface area of item 10 (e.g., the total surface area of the housing of item 10) may be covered with fabric 12 formed from strands 20. For example, the majority (>50%) of the surface may be covered with fabric to provide item 10 with a substantially fabric-covered appearance and feel, at least 25% of the surface may be covered with fabric, at least 50% of the surface may be covered with fabric, at least 75% of the surface may be covered, 20-80% of the surface may be covered, 50-95% of the surface may be covered, at least 85% of the surface may be covered, at least 95% of the surface may be covered, less than 90% of the surface may be covered, less than 60% of the surface may be covered, and/or other suitable fractions of the surface of the housing of item 10 and/or the total surface area of item 10 may be covered with one or more pieces of fabric 12.

As shown by the illustrative configuration of item 10 in FIG. 8, item 10 may be an electronic device having six sides 39 each of which is partly or fully covered by fabric 12 formed from strands 20. In general, an item such as item 10 of FIG. 8 may have any suitable number of sides and any suitable number of these sides may be fully or partly covered with fabric 12 (e.g., at least one side, at least two sides, at least three sides, at least four sides, at least five sides, six sides, etc.).

In configurations such as these, touch sensors such as the touch sensor of FIG. 4 may be formed from conductive strands on one or more sides 39 of item 10. For example, touch sensors formed from conductive strands may cover one to six surfaces (e.g., all six sides) of the electronic device. The touch sensors on an item such as item 10 may be used by the control circuitry of item 10 to detect different grip patterns when users grip the surfaces of item 10. Grip detection information may include information such as finger location, hand size, left/right hand identification information, and/or other information that allows users or types of users to be distinguished (e.g., to distinguish between adults and small children). Left/right grip detection may also be used to alter the location and/or appearance of virtual buttons on item 10 and/or to customize other features.

In the illustrative configuration of FIG. 8, item 10 has a box-shaped (rectangular-prism-shaped) housing, but other housing shapes may be used in forming a fabric-covered housing for item 10, if desired. Sensors other than capacitive touch sensors formed from fabric 12 (e.g., capacitive and/or optical touch and/or proximity sensors, force sensors, etc.) and/or haptic devices or other components 26 may also be located on one or all of the faces of the electronic device and may be overlapped by fabric 12, as described in connection with FIGS. 6 and 7.

Figure 9:
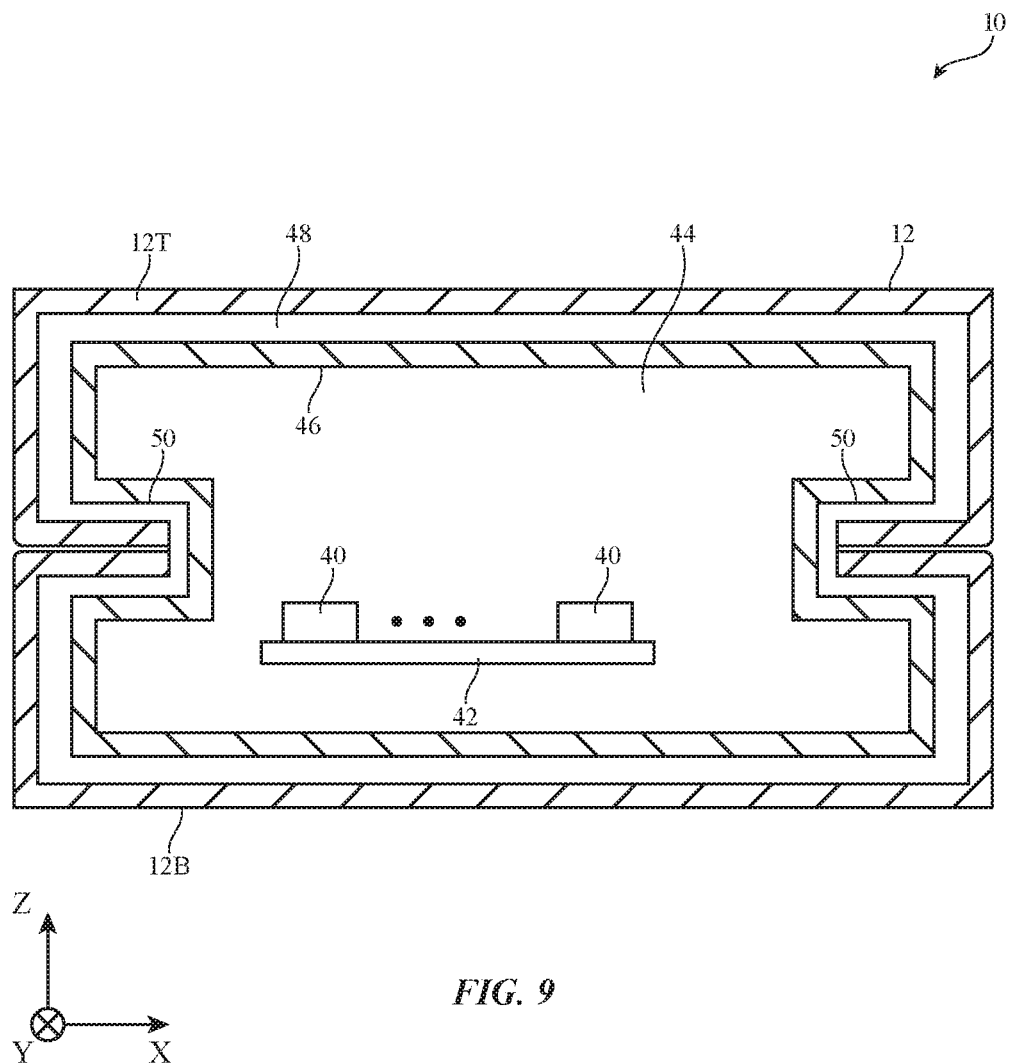
FIG. 9 is a cross-sectional side view of an illustrative electronic device with a fabric covering having hidden seams in accordance with an embodiment.

If desired, seams between mating panels of fabric 12 can be hidden from view by a user by using an arrangement of the type shown in FIG. 8. As shown in the illustrative cross-sectional side view of item 10 of FIG. 9, item 10 may have internal components 40 (e.g., circuitry 16) on substrates such as substrate 42. Substrate 42 may be a printed circuit or other substrate and may be located in interior 44 of housing 46. Housing 46 may be formed from plastic, metal, glass, ceramic, and/or other materials (e.g., housing structures of the type described in connection with structures 28 of FIG. 5). Fabric 12 may cover housing 46 and may be attached to housing 46 using an optional layer of adhesive such as adhesive 48. Fabric 12, which may be considered to cover housing 46 and/or form a portion of the housing for item 10 may have an upper portion such as portion 12T and a lower portion such as portion 12B. The edges of fabric 12T and the edge of fabric 12B may be inserted into notches 50 in housing 46. Notches 50 may run along the sides of housing 46 parallel to the longitudinal axis of housing 46 and may help hide the seam that is formed between fabric 12A and fabric 12B along these sides from view by a user. Notches 50 may be formed on vertical sidewall portions of item 10 (e.g., in a configuration in which item 10 normally lies flat in the X-Y plane as shown in FIG. 9), and/or may be formed elsewhere on item 10 in which fabric seams are located.

Figure 10:
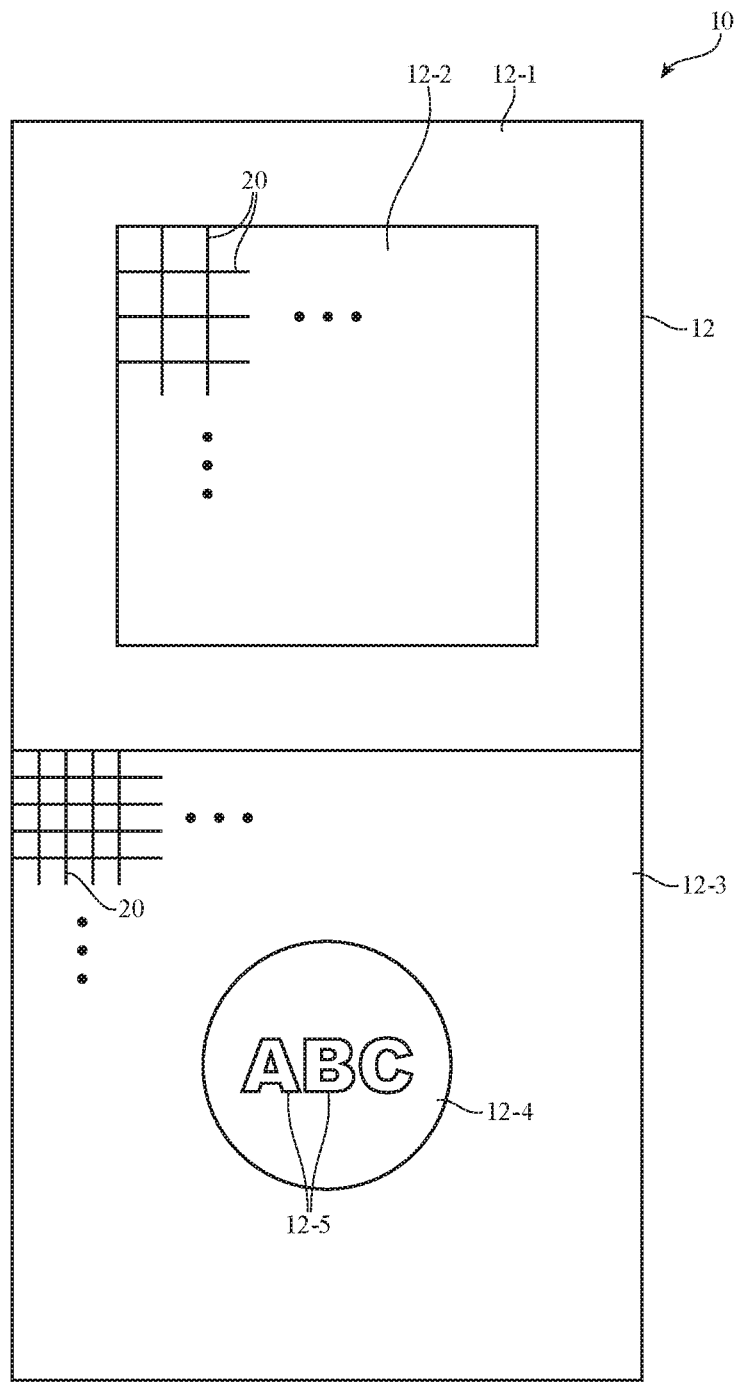
FIGS. 10 and 11 are top views of illustrative fabric-based items such as a fabric-covered remote controls or other electronic devices with fabric coverings in accordance with embodiments.

FIG. 10 is a view of the front face of an illustrative fabric-based item. As shown in FIG. 10, fabric 12 may have portions with different visual appearances. Illustrative fabric-based item 10 may be, for example, a remote control or other electronic device that gathers user input using touch sensors, buttons with switches, force sensors, proximity sensors, and/or other user input devices and that transmits the gathered information wirelessly to remote equipment (e.g., item 18 of FIG. 1) to control the operation of item 18 (e.g., to change video channels or other media playback changes, to navigate between audio tracks or other media tracks, to fast forward or rewind in a song or video, to adjust playback volume by adjusting the gain of output audio amplifiers coupled to speakers in item 18, etc.).

Fabric 12 of FIG. 10 covers item 10 on one or more sides (faces) of the housing for item 10. In the example of FIG. 10, area 12-1 has a first appearance and is free of touch sensor electrodes. Area 12-2 may contain a touch sensor such as the touch sensor formed from fabric 12 in FIG. 4 (or other input circuitry formed from components 26) and may have a second appearance that is the same as the first appearance or that is different than the first appearance (e.g., to visually distinguish area 12-2). Strands 20 may have a coarse weave or other characteristics that form a first texture in area 12-2 and a finer weave or other characteristics that form a second texture in other areas such as area 12-1, 12-3, and/or 12-4 to provide a user with a distinct feel in each of these regions. This may help a user identify different regions of the surface of item 10 in dim lighting conditions.

Strands 20 in area 12-3 may be woven with a finer texture than strands 20 in area 12-2, so that area 12-3 feels smoother than area 12-2 to the touch and may have a distinct appearance. Area 12-3 may be free of touch sensors (as an example). Area 12-4 may be associated with a button. The button may be a mechanical button that is used by pressing inwardly on area 12-4 to deform fabric 12 in area 12-4 and thereby actuate a dome switch or other button mechanism that is overlapped by area 12 or may be a capacitive sensor button (e.g., using a capacitive touch sensor formed from conductive strands in the fabric of area 12-4. Haptic devices in components 26 may overlap the input areas of item 10 such as area 12-4 and other areas. If desired, letters or other symbols may be woven or otherwise formed in areas such as area 12-4 (see, e.g., area 12-5).

In addition to variations in weaving techniques, fabric coarseness and/or other fabric construction differences, fabric treatments may be used in forming the different areas of item 10 shown in FIG. 10. These fabric treatments may include printing techniques or other coloring techniques, heating techniques (e.g., to locally fuse strands 20 together and thereby create denser and smoother areas of fabric 12 that stand out from surrounding untreated areas), cutting techniques (e.g., laser processing techniques such as laser fabric removal techniques to create ribs or other features), and/or other fabric treatment techniques such as locally embedding polymer or other material into fabric 12.

Figure 11:
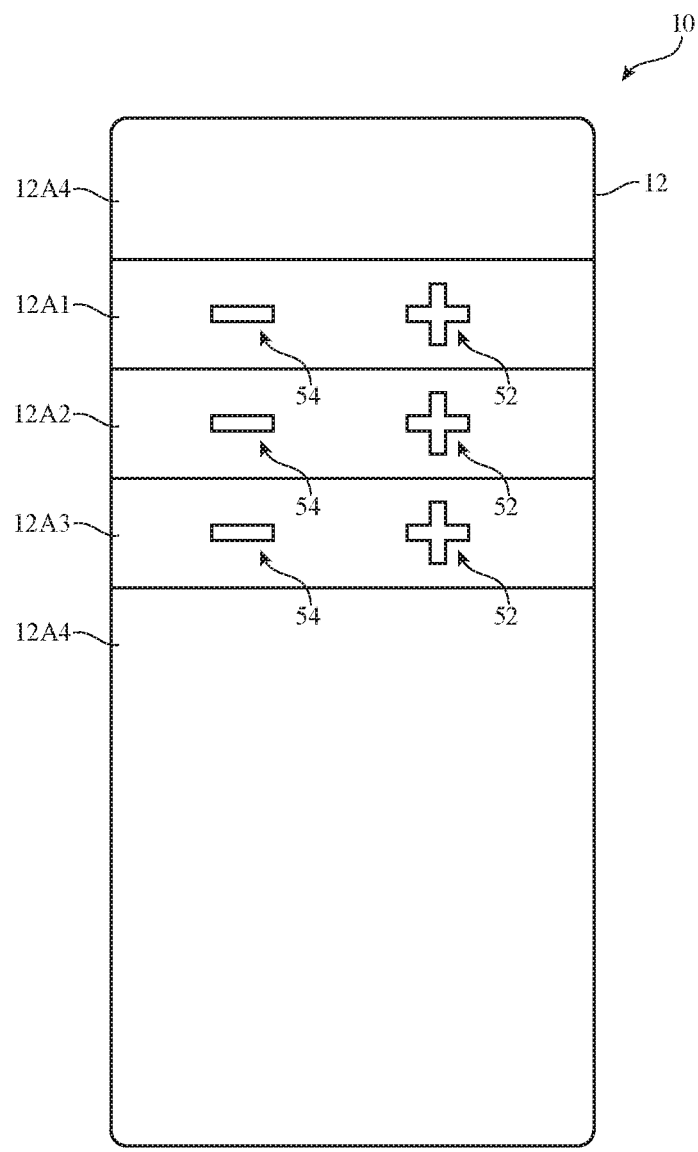

FIG. 11 shows how item 10 may include areas such as areas 12A1, 12A2, and 12A3 that contain symbols such as plus symbols 52 and minus symbols 54. Symbols 52 and 54 may be formed by locally altering the construction of fabric 12, by impregnating fabric 12 with patterned polymer (e.g., polymer containing dye or pigments to form ink) or printing or otherwise patterning other material in the shape of symbols 52 and 54 onto fabric 12, by locally heating the portion of fabric 12 associated with symbols 52 and 54, by using laser processing techniques to pattern the fabric in these areas, etc. The characteristics of areas 12A1, 12A2, and 12A3 may also be modified to vary from other areas (e.g., areas 12A4) using these processing techniques. Touch sensors and other components 26 (haptic components, input devices such as button switches, proximity sensors, force sensors, etc.) may be located under areas 12A1, 12A2, and 12A3 and/or other areas of item 10. If desired, touch sensors and other components 26 may be omitted from some areas of item 10 (e.g., areas 12A4). Configurations in which all fabric surfaces include touch sensors and/or overlap components 26 may also be used, if desired.

Figure 12:
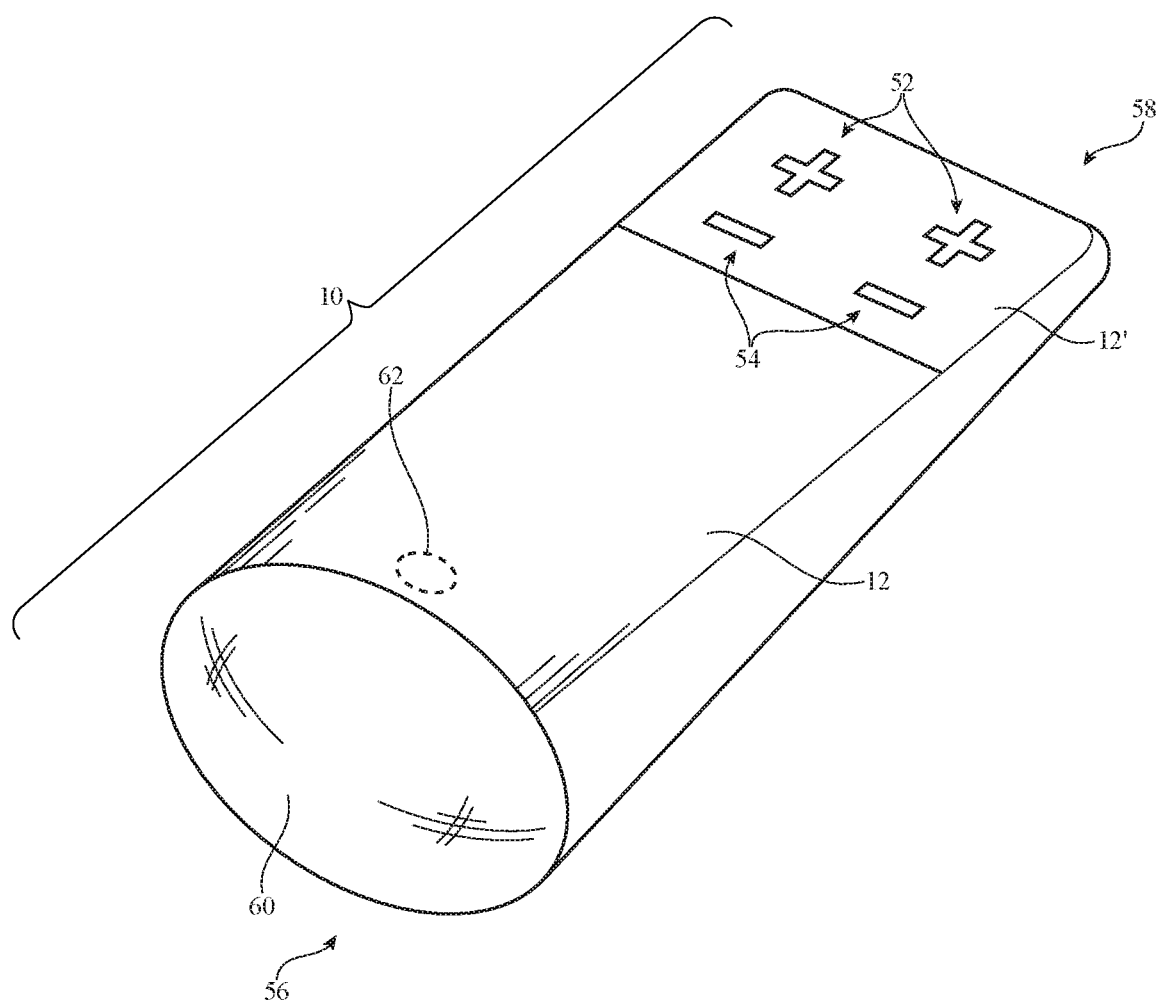
FIG. 12 is a perspective view of an illustrative fabric-based item such as a remote control or other electronic device with fabric covering in accordance with an embodiment.

In the illustrative configuration of FIG. 12, item 10 has a wedge shape in which the housing of item 10 tapers (narrows) progressively at increasing distances from end 56 towards end 58. Surface 60 at end 56 forms a curved (rounded) base for the housing of item 10. As shown in FIG. 12, surface 60 may have a curved shape such as a spherical surface shape or other shape with compound curvature. A weight (batteries, metal ballast, etc.) may be placed in the housing of item 10 in a location near to end 56 such as location 62 to provide item 10 with a self-righting feature (e.g., the portion of the housing that forms the rounded base for the housing may be weighted with a self-righting mass formed from iron or other heavy metal that is configured to hold the housing upright so that its longitudinal axis is aligned parallel to the surface normal of the surface on which item 10 is resting and perpendicular to the surface). Surfaces such as surface 60 and the other surfaces of item 10 may be covered with fabric 12. In regions such as region 12', the appearance and functionality of fabric 12 and the electrical components overlapped by fabric 12 may vary (e.g., touch sensors and/or other components 26 may be located under symbols 52 and 54 in region 12' but not in other portion of fabric 12, etc.).

Figure 13A:
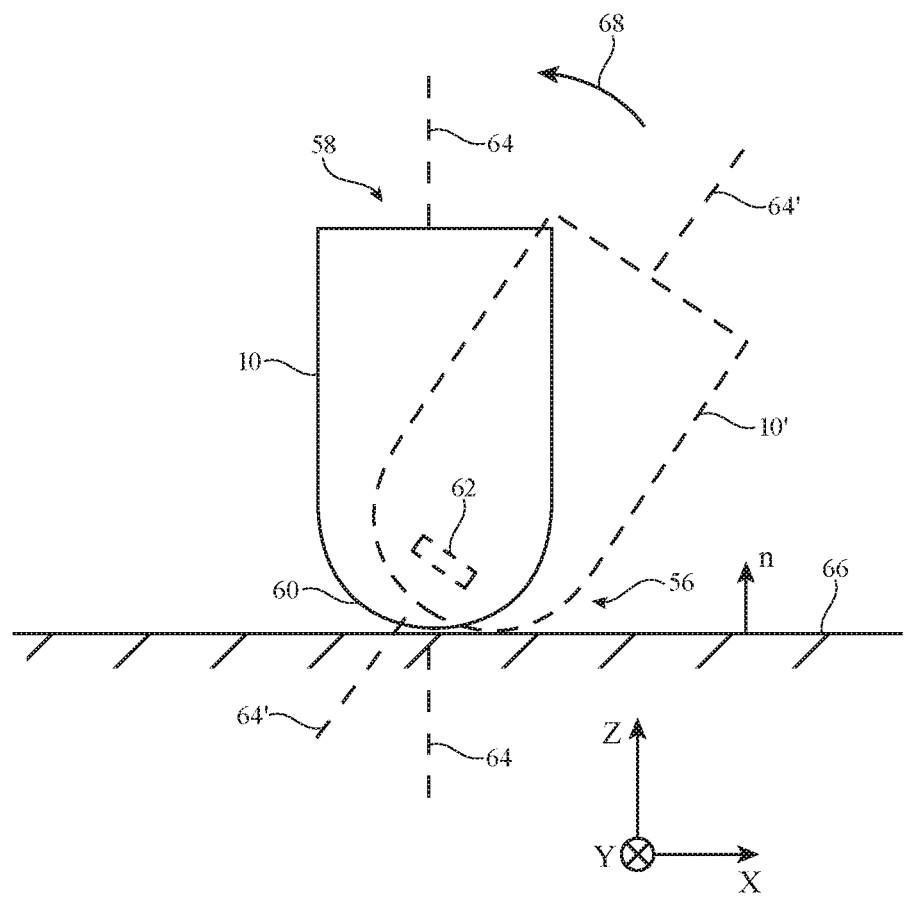
FIGS. 13A and 13B are side views of illustrative fabric-based items such as remote controls or other electronic devices showing how the items may have self-righting features in accordance with an embodiment.

FIG. 13A illustrates how the incorporation of weight in region 62 may help provide item 10 with an asymmetrical weight distribution that allows item 10 to right itself. As shown in FIG. 13A, item 10 may rest on a surface such as surface 66 (e.g., a table top). The housing of item 10 may be characterized by a longitudinal axis such as axis 64. When off balance, item 10 will tip on surface 66 so that the longitudinal axis of item 10 is not parallel to surface normal n of surface 66 (see, e.g., off-axis item 10' and tilted longitudinal axis 64'). In this situation, the location of weight 62 at end 56 and the curved shape of lower surface 60 of item 10 cooperate to force item 10 upwards in direction 68 (e.g., to the vertical position shown by item 10 and axis 64, where axis 64 is parallel to surface normal n and is therefore perpendicular to surface 66).

Figure 13B:
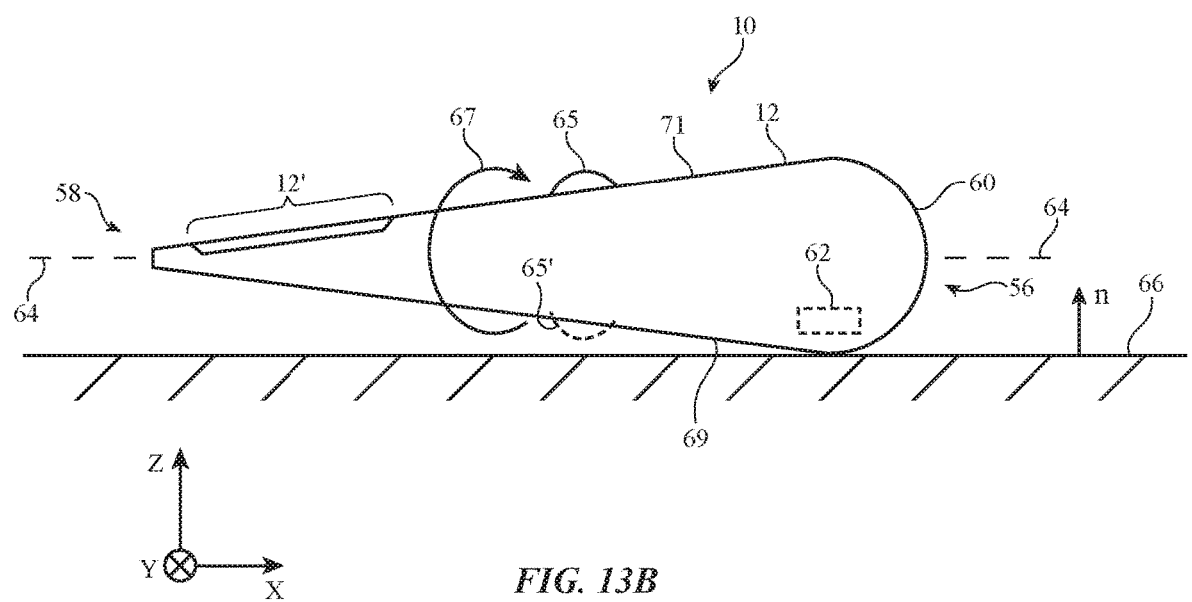

If desired, the weight in region 62 may be located at a position that self-rights item 10 in a horizontal orientation (e.g., with longitudinal axis 64 parallel to surface 66). This type of arrangement is shown in FIG. 13B. As shown in FIG. 13B, a weight may be located in a location such as region 62 that is adjacent to rear surface 69 of item 10 (e.g., relatively far from front surface 71). This provides item 10 with an asymmetrical weight distribution that allows item 10 to right itself so that buttons and other input-output devices in regions such as region 12' face upwardly for viewing and use by a user of item 10. As shown in FIG. 13B, item 10 may rest on a surface such as surface 66 (e.g., a table top). When originally placed on surface 66, buttons and other input-output components such as component 65 may be facing downward towards surface 66 (e.g., component 65 may be in location 65'). Due to the presence of weight in region 62, item 10 may rotate in direction 67 to its normal face-up configuration. In this configuration, component 65 and other components (e.g., input devices associated with symbols 52 and 54 of FIG. 12 in region 12', etc.) may be viewed by a user and pressed when it is desired to supply user input to item 10. In general, any suitable asymmetric weighting scheme may be used with item 10. The configurations of FIGS. 13A and 13B are merely illustrative.

Figure 14:
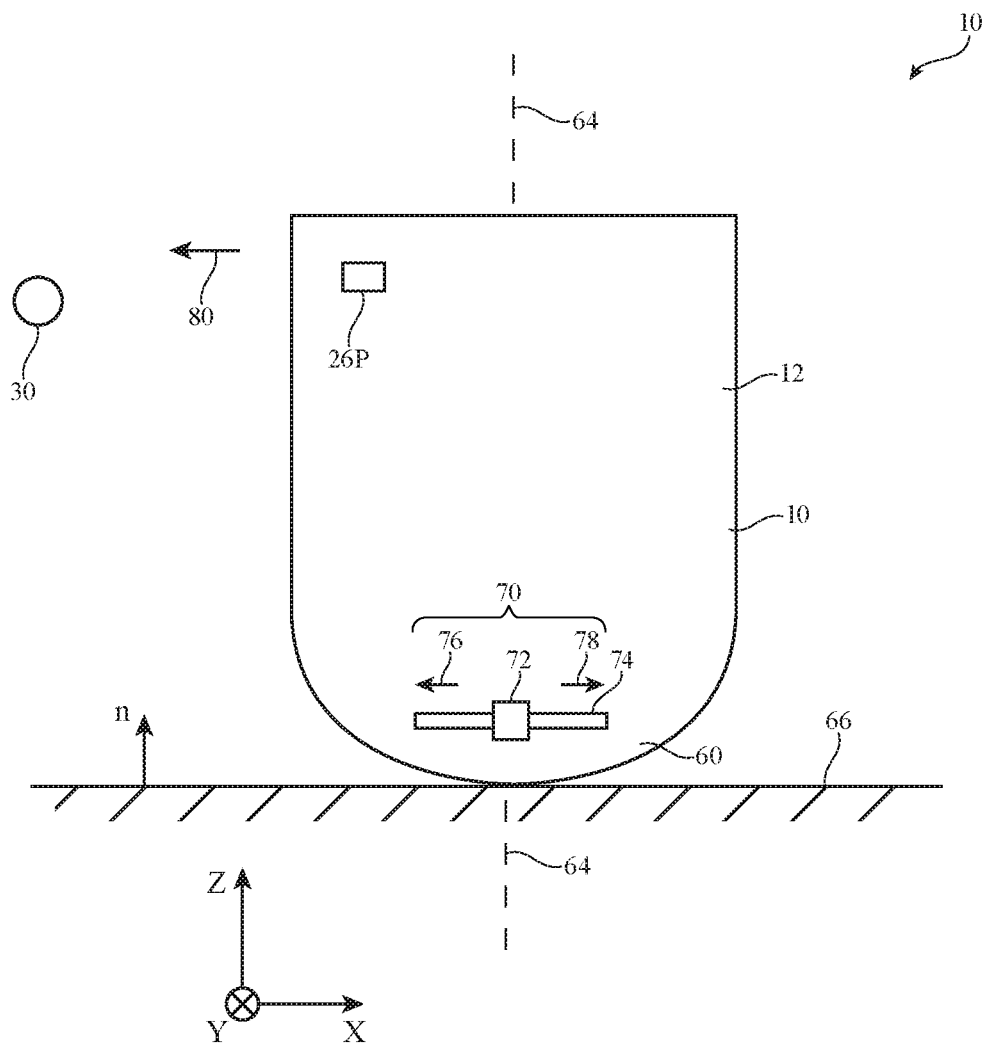
FIG. 14 is a cross-sectional side view of an illustrative fabric-based item with a movable weight system that can be used to dynamically tilt the item in a desired direction in accordance with an embodiment.

FIG. 14 is a diagram of item 10 in an illustrative configuration in which circuitry 16 can actively control the tilt of item 10 based on sensor input or other input. As shown in FIG. 14, item 10 may include an electrically adjustable weight such as electrically adjustable weight system 70 (sometimes referred to as an electrically adjustable moveable mass system). System 70 may include an electrically adjustable positioner and movable mass (see, e.g., movable mass and positioner 72, which may move on a track or other support such as support 74). During operation, the movable mass may be positioned by the electrically adjustable positioner (e.g., an electromagnetic actuator) in one or more dimensions (e.g., in the X-Y plane of FIG. 14). The positioner is electrically controllable by control circuitry in item 10, so the mass may be moved, for example in directions such as direction 76 and direction 78. Item 10 may have a sensor such as proximity sensor 26P (e.g., an optical proximity sensor, a capacitive proximity sensor, etc.). When a user's hand or other external object 30 is detected in the vicinity of item 10, the control circuitry of item 10 may move the mass of system 70 in direction 76, thereby causing item 10 to tilt towards the user's hand in direction 80 (e.g., so that longitudinal axis 64 tips towards the user's hand away from surface normal n of surface 66). This behavior may be used, for example, to facilitate user gripping of item 10 in dim lighting conditions.

Figure 15:
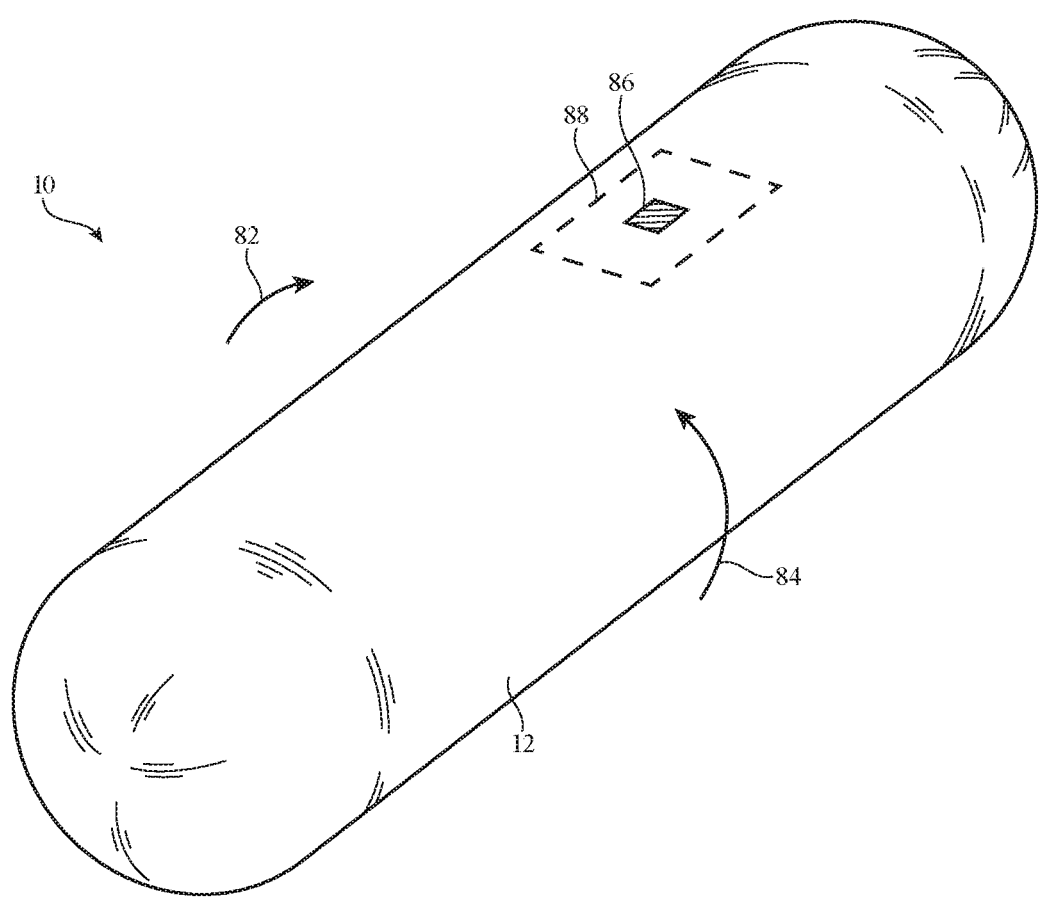
FIG. 15 is a perspective view of an illustrative self-righting fabric-based item with a cylindrical housing surface in accordance with an embodiment.

FIG. 15 is a perspective view of an illustrative cylindrically shaped fabric-based item. Illustrative item 10 of FIG. 15 may have a weight that allows item 10 to right itself (e.g., by restoring its desired orientation by movement in directions 82 or 84, as appropriate) and/or may have an electrically adjustable movable mass mechanism such as adjustable weight system 70 of FIG. 14. Item 10 may have areas with touch sensors and/or other components 26, areas with symbols or other patterns, and/or other features that allow item 10 to serve as a remote control (see, e.g., illustrative symbol 86 in area 88).

Figure 16:
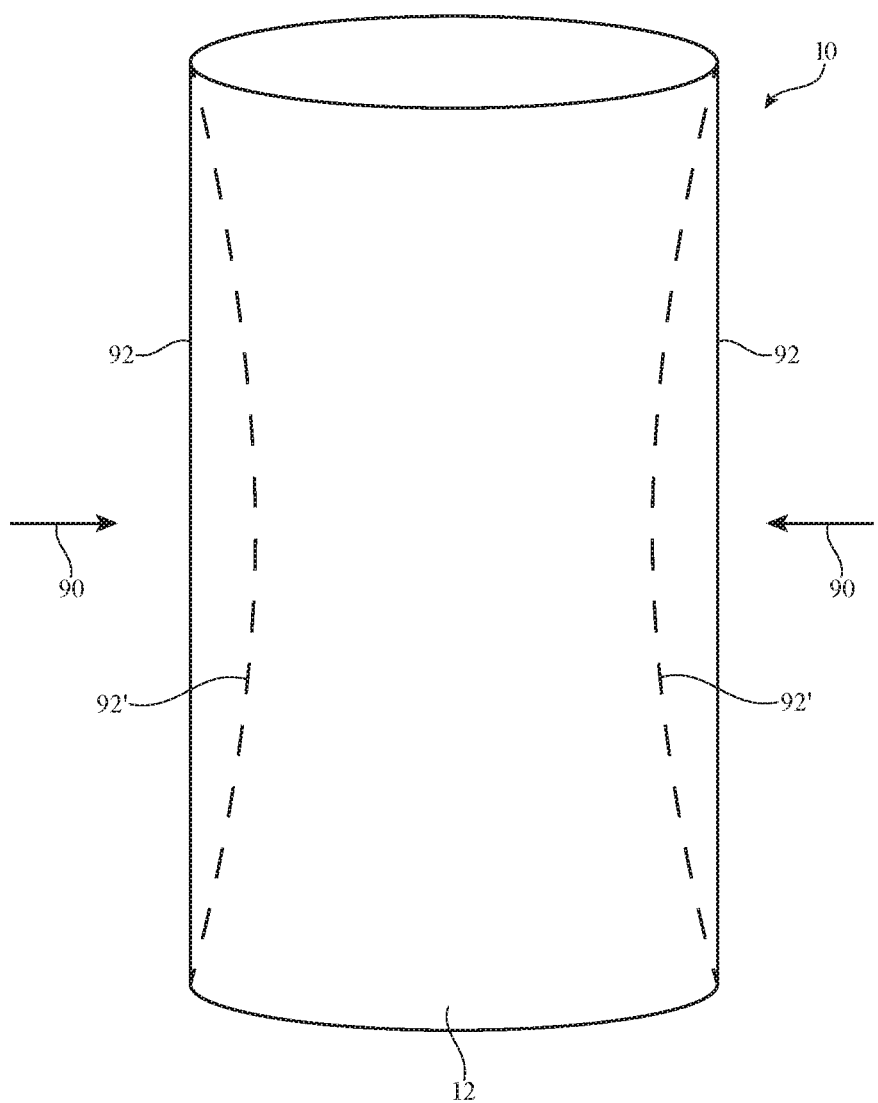
FIG. 16 is a side view of an illustrative fabric-based item with deformable housing walls in accordance with an embodiment.

As shown in FIG. 16, item 10 may have deformable portions. Some or all of the surface of the housing of item 10 may be covered with fabric 12. Fabric 12 may include conductive strands that serve as touch sensor electrodes and/or may overlap force sensors, touch sensors, proximity sensors, mechanical switches, or other components (see, e.g., the touch sensor of FIG. 4 and components 26 of FIG. 5). This sensor circuitry may, for example, be located on the sides of item 10 of FIG. 16. A layer of foam (see, e.g., layer 28 of FIG. 5) may be formed under the sensor circuitry to detect deformation of the sides of item 10 when pressed inwardly by a user (e.g., when a user squeezes item 10). In the example of FIG. 16, item 10 initially has an undeformed shape given by unbent housing wall surfaces 92. When a user grips and squeezes item 10 inwardly in directions 90, the walls of item 10 (e.g., the foam or other compressible material under fabric 12 and/or fabric 12) compress inwardly, so that straight housing wall surfaces become deformed as shown by deformed housing wall surfaces 92'. Control circuitry in item 10 can take suitable action in response to detection of deformation of fabric 12 and the associated surfaces of item 10. For example, a wireless command may be issued (e.g., to increase or decrease volume of remote equipment 18, to change a media playback track, to adjust household equipment such as heating or lighting, etc.).

Figure 17:
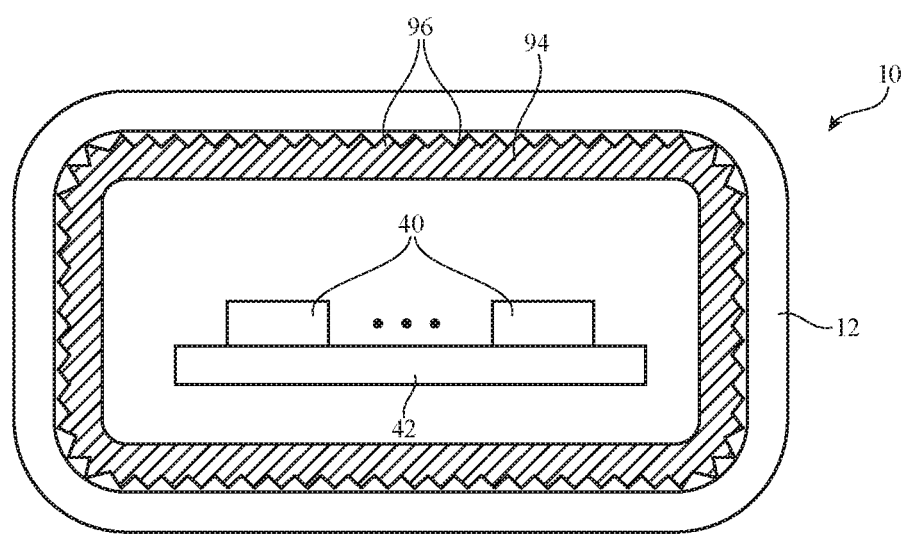
FIG. 17 is a cross-sectional side view of an illustrative fabric-based item having a fabric-covered housing structure with ribs or other protrusions that form a textured surface in accordance with an embodiment.

If desired, support structures such as illustrative structures 28 of FIG. 5 may be provided with a texture that can be felt by the fingers of a user through fabric 12 when gripping item 10. This type of arrangement is shown in the cross-sectional side view of illustrative item 10 of FIG. 17. In the example of FIG. 17, item 10 has a housing formed from support structures 94 covered with fabric 12. Fabric 12 may be sufficiently thin to allow underlying features to locally change the texture and feel of fabric 12. Structures 94 may be formed from molded plastic, metal, and/or other materials. Surface features such as protrusions (ribs, bumps, etc.), recesses (grooves, pits, etc.), or other textured features such as textured structures 96 may provide item 10 with a textured surface when item 10 is handled by a user.

The foregoing is merely illustrative and various modifications can be made to the described embodiments. The foregoing embodiments may be implemented individually or in any combination.

What is claimed is:
1. A fabric-based item, comprising:
a housing;
a fabric layer covering a majority of the housing;
a touch sensor electrode that is overlapped by the fabric layer;
wireless communications circuitry; and control circuitry configured to transmit wireless signals with the wireless communications circuitry.

2. The fabric-based item defined in claim 1, wherein the control circuitry is configured to transmit the wireless signals with the wireless communications circuitry in response to information from the touch sensor electrode.

3. The fabric-based item defined in claim 1, wherein the touch sensor electrode is on a first side of the housing and wherein the fabric layer overlaps the first side of the housing.

4. The fabric-based item defined in claim 3, wherein the fabric layer has first and second areas of different appearances on the first side of the housing.

5. The fabric-based item defined in claim 4, wherein the first area of the fabric layer overlaps the touch sensor electrode and wherein the second area of the fabric layer does not overlap any touch sensor electrodes.

6. The fabric-based item defined in claim 1, wherein the touch sensor electrode is configured to gather user input.

7. A fabric-based item, comprising:
   a housing;
   a fabric layer covering a majority of the housing;
   a haptic device that is overlapped by the fabric layer;
   wireless communications circuitry; and
   control circuitry configured to transmit wireless signals with the wireless communications circuitry.

8. The fabric-based item defined in claim 7, further comprising:
   input circuitry that is overlapped by the fabric layer, wherein the control circuitry is configured to transmit the wireless signals with the wireless communications circuitry in response to information from the input circuitry.

9. The fabric-based item defined in claim 8, wherein the input circuitry is configured to gather user input and comprises an electrical component selected from the group consisting of: a switch, a touch sensor, a force sensor, and a proximity sensor.

10. The fabric-based item defined in claim 9, wherein the input circuitry is configured to gather the user input from a user and wherein the haptic device is configured to provide the user with tactile feedback.

11. The fabric-based item defined in claim 10, wherein the input circuitry is configured to detect a press of a virtual button by the user and wherein the haptic device is configured to provide the user with the tactile feedback in response to the input circuitry detecting the press of the virtual button.

12. The fabric-based item defined in claim 7, wherein the haptic device comprises an actuator.

13. The fabric-based item defined in claim 7, wherein the haptic device comprises a device selected from the group consisting of: a vibrator, a linear solenoid, and a piezoelectric actuator.

14. The fabric-based item defined in claim 7, wherein the fabric layer includes first and second areas having different appearances and wherein the haptic device is covered by the first area of the fabric layer.

15. A fabric-based item, comprising:
   a housing;
   a fabric layer covering a majority of the housing;
   a light sensor that is overlapped by the fabric layer;
   wireless communications circuitry; and
   control circuitry configured to transmit wireless signals with the wireless communications circuitry.

16. The fabric-based item defined in claim 15, wherein the control circuitry is configured to transmit the wireless signals with the wireless communications circuitry in response to information from the light sensor.

17. The fabric-based item defined in claim 15, wherein the light sensor is on a first side of the housing and wherein the fabric layer overlaps the first side of the housing.

18. The fabric-based item defined in claim 17, wherein the fabric layer has first and second areas of different appearances on the first side of the housing and wherein the light sensor is overlapped by the first area of the fabric layer.

19. The fabric-based item defined in claim 18, further comprising:
   a light-emitting component that emits light through the first area of the fabric layer, wherein the light sensor and the light-emitting component form a proximity sensor.

20. The fabric-based item defined in claim 15, further comprising:
   a light-emitting component that emits light through the fabric layer, wherein the light sensor and the light-emitting component form a proximity sensor.

* * * * *